US012428247B2

(12) United States Patent
Morimoto et al.

(10) Patent No.: US 12,428,247 B2
(45) Date of Patent: Sep. 30, 2025

(54) IMAGE RECORDING APPARATUS

(71) Applicant: BROTHER KOGYO KABUSHIKI KAISHA, Nagoya (JP)

(72) Inventors: Nao Morimoto, Nagoya (JP); Yuya Tatematsu, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 11 days.

(21) Appl. No.: 18/165,112

(22) Filed: Feb. 6, 2023

(65) Prior Publication Data

US 2023/0249930 A1 Aug. 10, 2023

(30) Foreign Application Priority Data

Feb. 7, 2022 (JP) ................................ 2022-017094

(51) Int. Cl.
*B41J 13/10* (2006.01)
*B41J 13/14* (2006.01)
*B65H 1/26* (2006.01)

(52) U.S. Cl.
CPC ............ *B65H 1/266* (2013.01); *B41J 13/103* (2013.01); *B41J 13/14* (2013.01)

(58) Field of Classification Search
CPC ......... B41J 13/103; B41J 13/14; B65H 1/266; B65H 3/0684; B65H 3/266; B65H 3/56; B65H 2405/1132; B65H 2405/1134; B65H 2405/1136; B65H 2405/141; B65H 2801/06
See application file for complete search history.

(56) References Cited

U.S. PATENT DOCUMENTS

| | | | | |
|---|---|---|---|---|
| 6,338,480 B1 | 1/2002 | Endo | | |
| 2014/0339757 A1* | 11/2014 | Aoki | ...................... | B65H 1/266 271/145 |
| 2015/0115517 A1* | 4/2015 | Asada | ...................... | B65H 5/26 271/9.11 |
| 2019/0212688 A1* | 7/2019 | Tokoro | ...................... | B65H 3/68 |

FOREIGN PATENT DOCUMENTS

| | | |
|---|---|---|
| JP | 8-225175 A | 9/1996 |
| JP | 10-120218 A | 5/1998 |
| JP | 10-218408 A | 8/1998 |
| JP | 2000-247467 A | 9/2000 |

* cited by examiner

*Primary Examiner* — Anh T Vo
(74) *Attorney, Agent, or Firm* — Merchant & Gould P.C.

(57) ABSTRACT

An image recording apparatus includes a housing in which a conveying path is formed, a feed tray insertable into and removable from the housing and including an accommodating portion configured to accommodate sheet media in a stacked state, an image recording unit configured to record an image on one of the sheet media in the conveying path, a guide member provided at a facing portion of the housing which faces an end portion of the feed tray inserted into the housing, and configured to guide one of the sheet media in the accommodating portion to the conveying path, and a separator pivotally provided at the facing portion of the housing and configured to separate the sheet media guided by the guide member one by one.

8 Claims, 9 Drawing Sheets

FIG. 8

| OCCURRING MALFUNCTION | OCCURRENCE INFLUENCE FACTOR | | | | |
|---|---|---|---|---|---|
| | SEPARATION RESISTANCE | SHEET THICK-NESS | ARM SWING ANGLE | SEPARATION DISTANCE D BETWEEN ROLLER AND GUIDE | DEGREE OF DIFFICULTY IN SHEET FEEDING |
| MULTI-FEEDING | LOW | THIN | LARGE (EMPTY) | LARGE (FULLY LOADED) | EASY |
| IDLE FEEDING | HIGH | THICK | SMALL (FULLY LOADED) | SMALL (EMPTY) | DIFFICULT |

| OCCURRENCE PREVENTION MEASUR | |
|---|---|
| SEPARATION DISTANCE | REARWARD PIVOT ANGLE OF SEPARATION PIECE |
| INCREASE | REDUCE |
| REDUCE | INCREASE |

IMAGE RECORDING APPARATUS

REFERENCE TO RELATED APPLICATIONS

This application claims priority from Japanese Patent Application No. 2022-017094 filed on Feb. 7, 2022. The entire content of the priority application is incorporated herein by reference.

BACKGROUND ART

In the related art, a technique of feeding sheet media stacked in an accommodating portion to a conveying path by a feed roller is known. In the related-art technique, a separation piece for separating the sheet media one by one is provided on a deep side of the accommodating portion. The separation piece is pivotally provided on an image recording apparatus main body, and a pivot angle of the separation piece is adjusted by a thickness dimension of a paper sheet when the paper sheet inserted into a paper pocket is brought into contact with a protrusion holding the separation piece.

At the time of feeding the sheet media stacked in the accommodating portion of the image recording apparatus, the paper sheets may not be insufficiently separated by the separation piece, and a plurality of sheets may be collectively fed, that is, so-called multi-feeding may occur. In particular, such a tendency is likely to occur when relatively thin sheet media are used, when the number of stacked sheet media is relatively large, or the like.

In order to avoid the occurrence and reduce the multi-feeding rate, it is conceivable to increase a separation resistance by pivoting the separation piece so as to take a posture as close to a vertical state as possible. However, in this case, when relatively thick sheet media are used, idle feeding may occur due to an increase in the separation resistance. Therefore, it is necessary to make a study so as to achieve both prevention of multi-feeding of thin sheet media and prevention of idle feeding of thick sheet media.

The present disclosure provides an image recording apparatus capable of preventing multi-feeding of thin sheet media and preventing idle feeding of thick sheet media when the sheet media are separated one by one using a separation piece.

DESCRIPTION

According to an aspect of the present disclosure, an image recording apparatus includes a housing in which a conveying path is formed, a feed tray insertable into and removable from the housing and including an accommodating portion configured to accommodate sheet media in a stacked state, an image recording unit configured to record an image on one of the sheet media in the conveying path, a guide member provided at a facing portion of the housing which faces an end portion of the feed tray inserted into the housing, and configured to guide one of the sheet media in the accommodating portion to the conveying path, and a separator pivotally provided at the facing portion of the housing and configured to separate the sheet media guided by the guide member one by one.

In the present disclosure, an image is recorded by the image recording unit on the sheet medium in the conveying path formed in the housing. The feed tray to be inserted into and removed from the housing is provided with the accommodating portion, and the sheet media accommodated in the accommodating portion are guided to the conveying path by the guide member fixed to the facing portion.

The separation piece is pivotally provided at the facing portion of the housing separately from the guide member, and separates the sheet media guided by the guide member one by one. For example, when a thick sheet medium is brought into contact with the separation piece, due to large rigidity of the sheet medium, the separation piece is pivoted to a slightly horizontal posture, separation resistance may be reduced, and idle feeding may be prevented. For example, when a thin sheet medium is brought into contact with the separation piece, due to low rigidity of the sheet media, the separation piece is not pivoted but takes a slightly vertical posture, the separation resistance may be increased and multi-feeding may be prevented.

According to the present disclosure, since a posture of the pivotable separation piece varies depending on whether the sheet medium is thick or thin, both the prevention of multi-feeding of thin sheet media and the prevention of idle feeding of thick sheet media may be achieved.

According to the present disclosure, when the sheet media are separated one by one using the separation piece, both the prevention of multi-feeding of thin sheet media and the prevention of idle feeding of thick sheet media may be achieved.

FIG. 8 is a diagram illustrating a relationship between occurrence influence factors corresponding to various occurring malfunctions and occurrence prevention measures.

OVERALL CONFIGURATION OF IMAGE RECORDING APPARATUS

Figure 1:
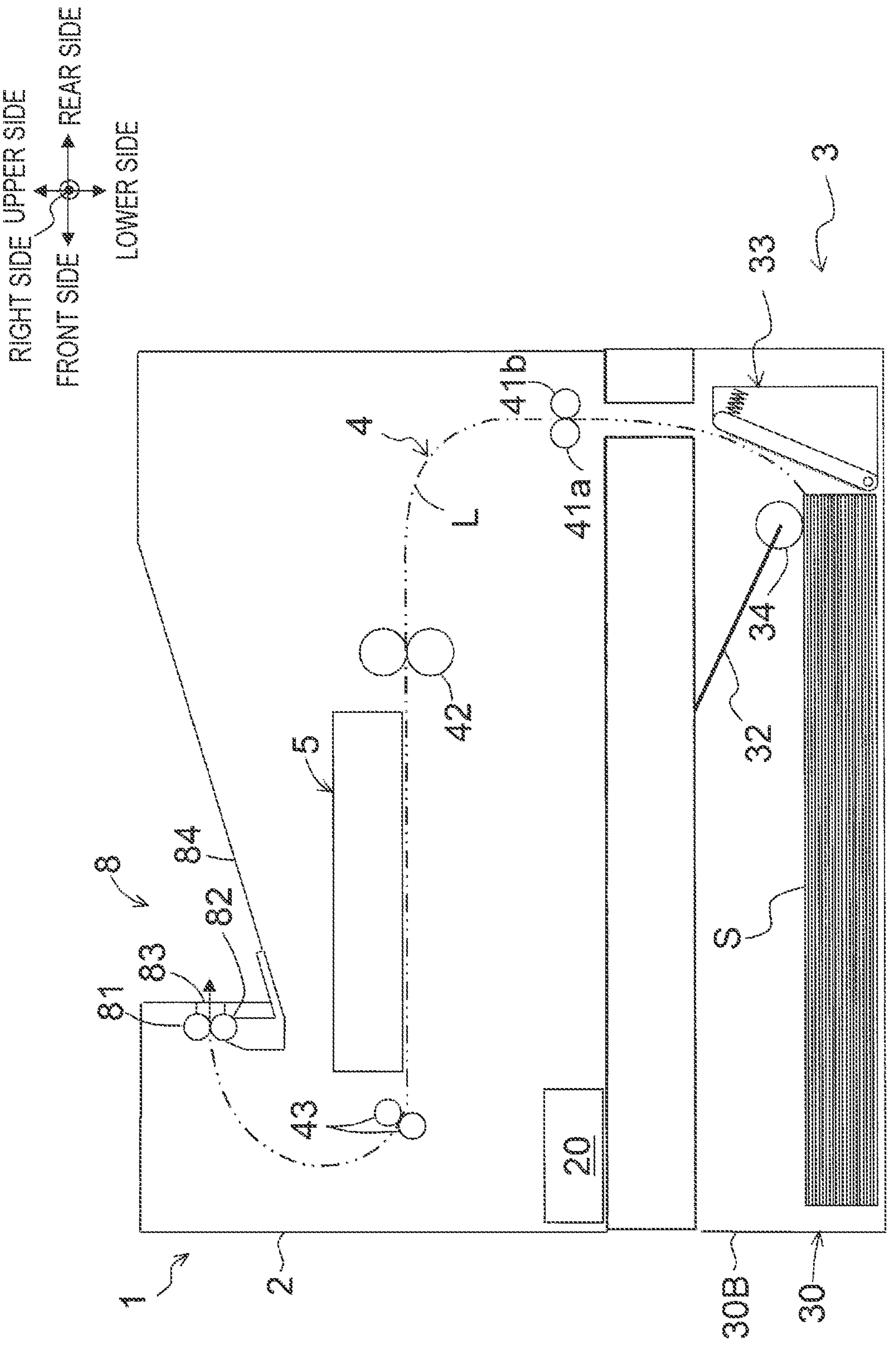
FIG. 1 is a schematic diagram illustrating an overall configuration of an image recording apparatus according to an embodiment of the present disclosure.

FIG. 1 schematically illustrates an overall cross-sectional configuration of an image recording apparatus 1 according to an embodiment of the present disclosure. In FIG. 1, the image recording apparatus 1 includes a housing 2, and a supply unit 3, a conveying unit 4, an image recording unit 5, and a discharge unit 8 are provided in the housing 2. A side on which the discharge unit 8 is provided is a front side of the image recording apparatus 1, and a side on which the conveying unit 4 is provided is a rear side of the image recording apparatus 1. A side on which the supply unit 3 is provided is a lower side of the image recording apparatus 1, and a side on which the image recording unit 5 is provided is an upper side of the image recording apparatus 1.

Supply Unit

The supply unit 3 includes a feed tray 30 detachably attached at a lower portion of the housing 2, a swing arm 32, and a feed guide mechanism 33.

The feed tray 30 includes an accommodating portion 30B that forms an outer shell. Sheets S on each of which an image is to be recorded may be accommodated in the accommodating portion 30B. The sheet S is an example of a sheet medium. As shown in FIG. 1, a plurality of sheets S placed substantially horizontally are accommodated in the accommodating portion 30B of the feed tray 30 so as to be stacked in an upper-lower direction, and the feed tray 30 in a state where the sheets S are accommodated in this manner is mounted so as to be inserted from a front side toward a rear side of the housing 2. The front side of the image recording apparatus 1 is an example of a near side along the insertion direction of the feed tray 30, and the rear side of the image recording apparatus 1 is an example of a deep side (back side) along the insertion direction of the feed tray 30.

The swing arm 32 is provided such that a feed roller 34 provided at a lower end portion of the swing arm 32 is brought into contact with a rear side of an uppermost sheet among the sheets S stacked in the feed tray 30. In the housing 2 of the image recording apparatus 1, a conveying path L extending from the feed roller 34 to the discharge unit 8 via the feed guide mechanism 33, the conveying unit 4, and the image recording unit 5 is formed. When the sheets S are held in the feed tray 30, the feed roller 34 picks up the sheets S in the feed tray 30 one by one and conveys the picked-up sheet S along the conveying path L toward the feed guide mechanism 33, the conveying unit 4, and the image recording unit 5. A detailed configuration of each unit in the supply unit 3 will be described later with reference to FIGS. 3 to 6.

Conveying Unit

The conveying unit 4 holds the sheet S supplied from the supply unit 3 and conveys the sheet S to the image recording unit 5. The conveying unit 4 includes a conveying roller 41*a* driven by a motor (not shown) and registration rollers 42. The conveying roller 41*a* is a roller for applying a conveying force to the sheet S. The sheet S conveyed from the feed roller 34 toward the conveying roller 41*a* is nipped by the conveying roller 41*a* and a paper dust removing roller 41*b*, and is conveyed toward the registration rollers 42 along the conveying path L. The registration rollers 42 correct a posture of the sheet S and then conveys the sheet S to the image recording unit 5.

Image Recording Unit

The image recording unit 5 performs printing by forming an image on the sheet S, which is conveyed from the conveying unit 4, by a known electrophotographic method, an inkjet method, a thermal transfer method, or the like. The sheet S conveyed from the image recording unit 5 toward conveying rollers 43 is nipped by the conveying rollers 43 and is conveyed toward a discharge roller 81 along the conveying path L.

Discharge Unit

The discharge unit 8 discharges the sheet S, on which an image is recorded and which is discharged from the image recording unit 5, to the outside of the image recording apparatus 1. The discharge unit 8 includes the discharge roller 81, a discharge roller 82, a discharge port 83, and a discharge tray 84. The discharge roller 81 is driven to rotate by power from the motor described above, and conveys the sheet S discharged from the image recording unit 5 toward the discharge tray 84.

Control System

Figure 2:
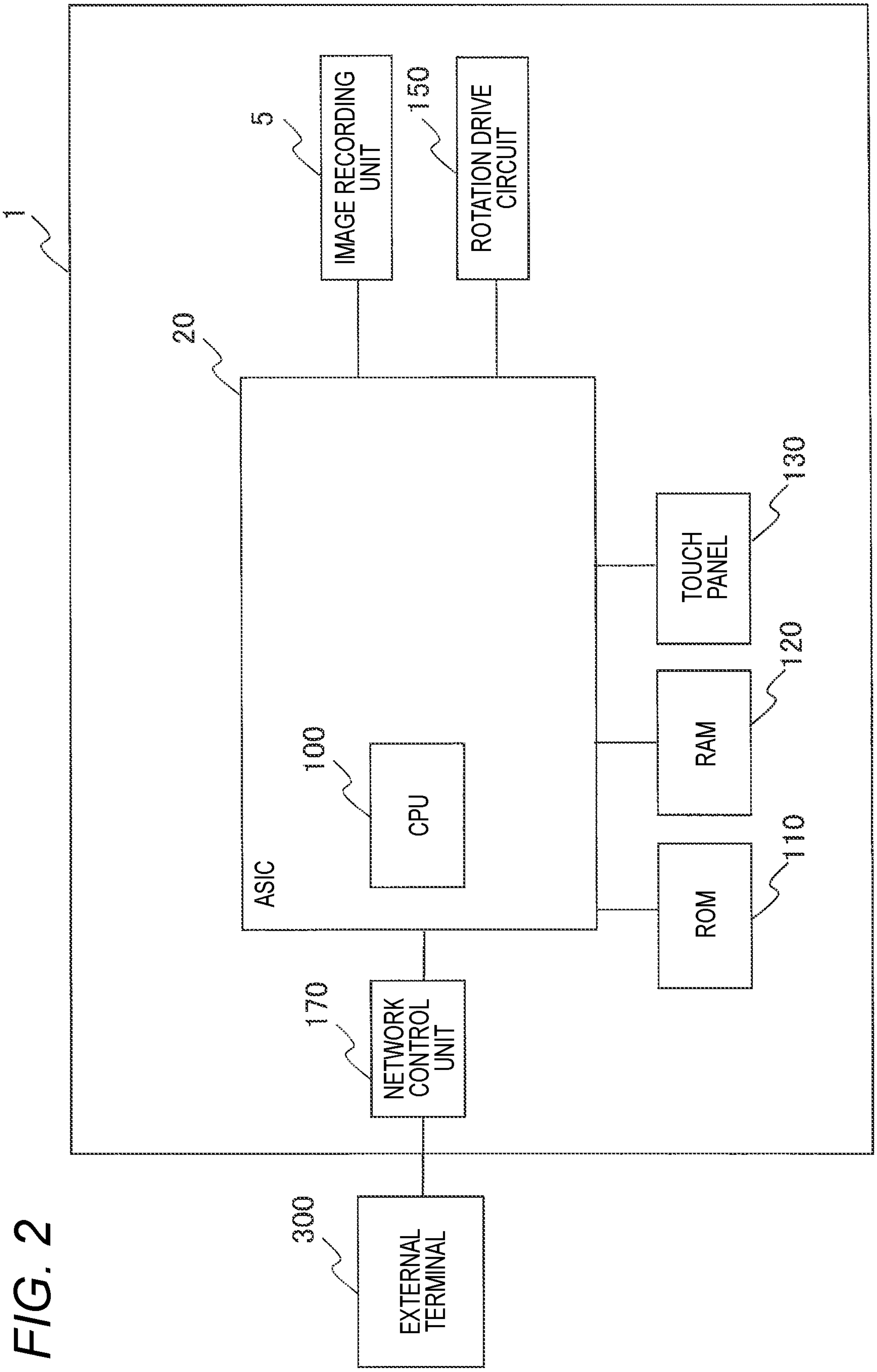
FIG. 2 is a block diagram illustrating a control system of the image recording apparatus.

The operations of units of the image recording apparatus 1 including rotation and stop of the motor are controlled by an application specific integrated circuit (ASIC) 20. FIG. 2 is a block diagram illustrating a control system of the image recording apparatus 1 including the ASIC 20. As shown in FIG. 2, the ASIC 20 includes a CPU 100. A ROM 110, a RAM 120, a touch panel 130 that performs desired display and may be operated by a user, the image recording unit 5, a rotation drive circuit 150, and a network control unit 170 are connected to the ASIC 20.

The ROM 110 stores various control programs necessary for the image recording apparatus 1 to operate. The CPU 100 controls each unit according to a program read from the ROM 110.

The CPU 100 instructs the image recording unit 5 to record an image on the sheet S by outputting a print instruction signal to the image recording unit 5 via the ASIC 20. The CPU 100 controls the rotation of the motor by outputting a drive control signal to the rotation drive circuit 150, that controls the rotation of the motor, via the ASIC 20. Further, the CPU 100 controls the network control unit 170 via the ASIC 20 to exchange information with an external terminal 300 via wireless or wired network communication.

Detailed Configuration of Feed Guide Mechanism

Figure 3:
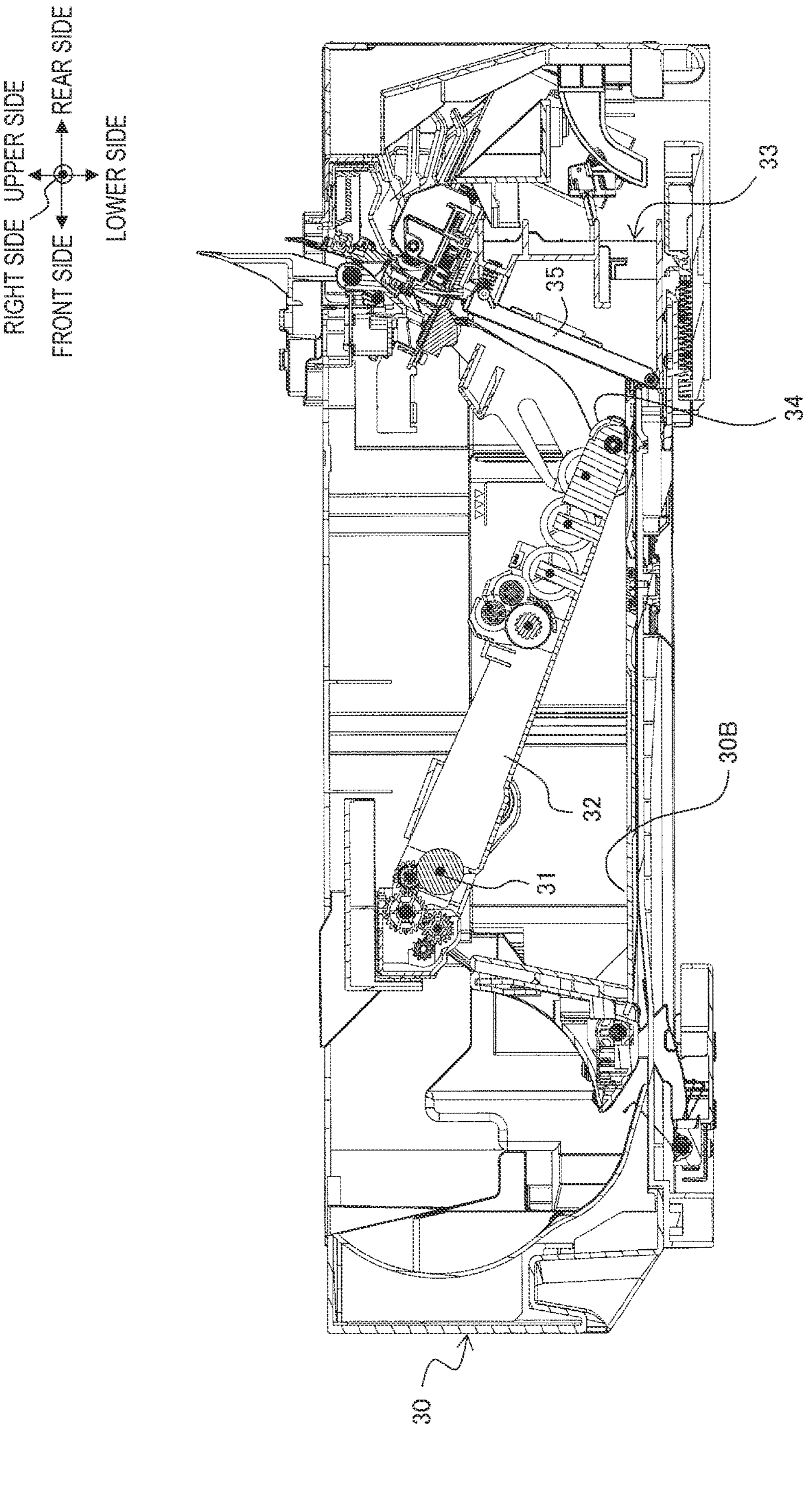
FIG. 3 is a cross-sectional view illustrating an example of a detailed configuration of a supply unit including a feed guide mechanism, taken along a front-rear direction.
Figure 4:
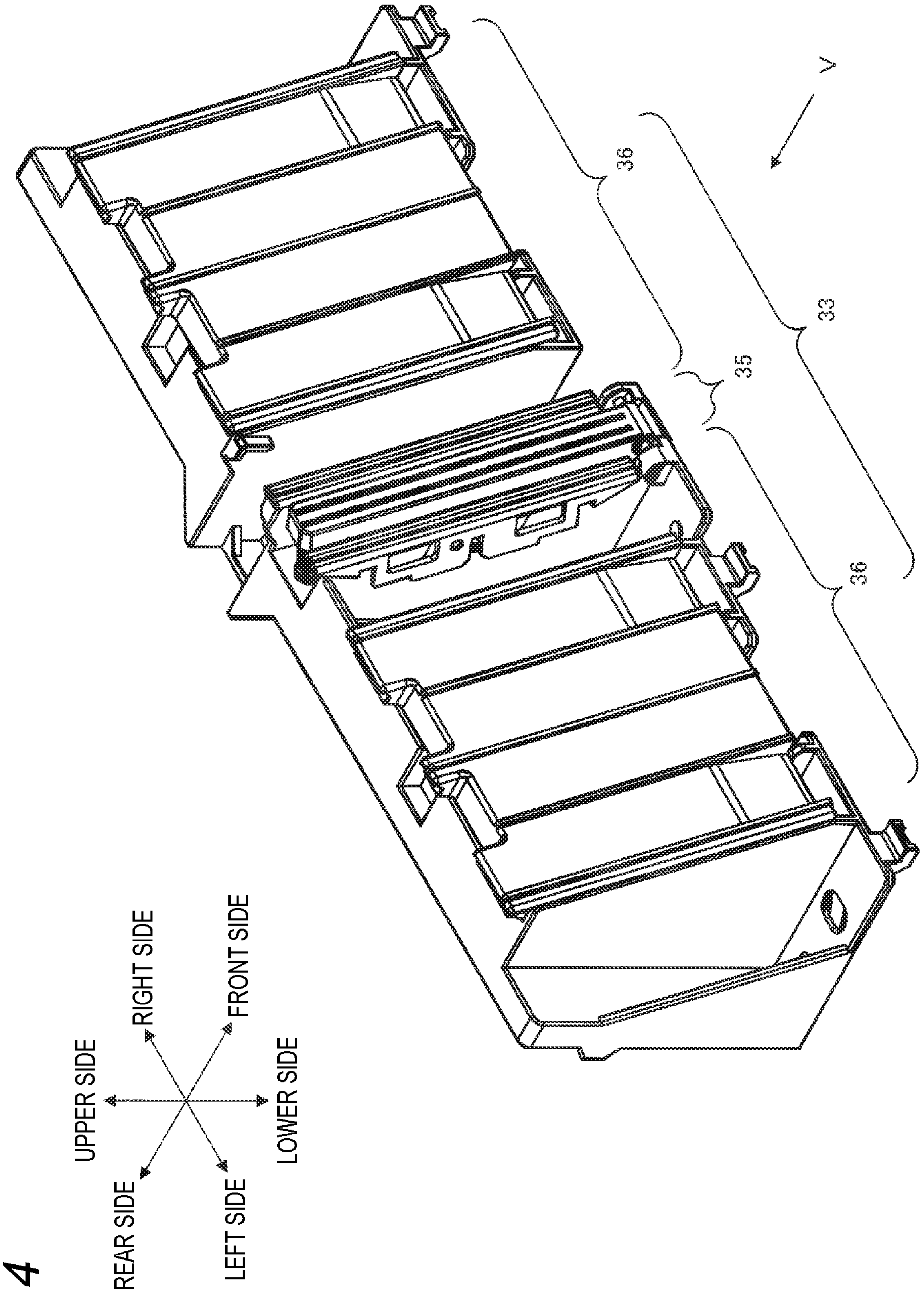
FIG. 4 is a perspective view of the entire feed guide mechanism.

Next, a detailed configuration of the feed guide mechanism 33 included in the supply unit 3 will be described with reference to FIGS. 3 to 6. First, FIG. 3 illustrates an example of a detailed configuration of the supply unit 3 including the feed guide mechanism 33 according to an example of the present embodiment in a cross section along the front-rear direction. The supply unit 3 illustrated in FIG. 3 is illustrated in an empty state in which no sheet S is stacked in the accommodating portion 30B of the feed tray 30.

In FIG. 3, the feed guide mechanism 33 is fixed to a portion facing an end portion on the deep side (rear side in FIG. 3) along the insertion direction of the feed tray 30 inserted into the housing 2, and functions to guide the sheet S in the accommodating portion 30B to the conveying path L. As illustrated in the perspective view of FIG. 4 and the front view of FIG. 5, the entire feed guide mechanism 33 is formed in a columnar shape having a longitudinal axis extending in a left-right direction, and a front side surface of the feed guide mechanism 33 is inclined at such an angle that an upper end portion thereof falls rearward than a lower end portion thereof, so that an orthogonal cross section of the columnar shape in the longitudinal axis direction (left-right direction) has a trapezoidal shape.

Further, on the front side surface of the entire feed guide mechanism 33, a separation piece 35 is provided at a center position in the left-right direction, and the separation piece 35 may be pivoted rearward by a predetermined angle around a lower end portion thereof. That is, the inclined side surface for guiding the sheet S on the front side of the feed guide mechanism 33 includes the separation piece 35 which is a part at the center in the left-right direction and whose inclination angle may be changed rearward, and guide members 36 which occupy most of both sides of the separation piece 35 and whose inclination angles are fixed.

Figure 5:
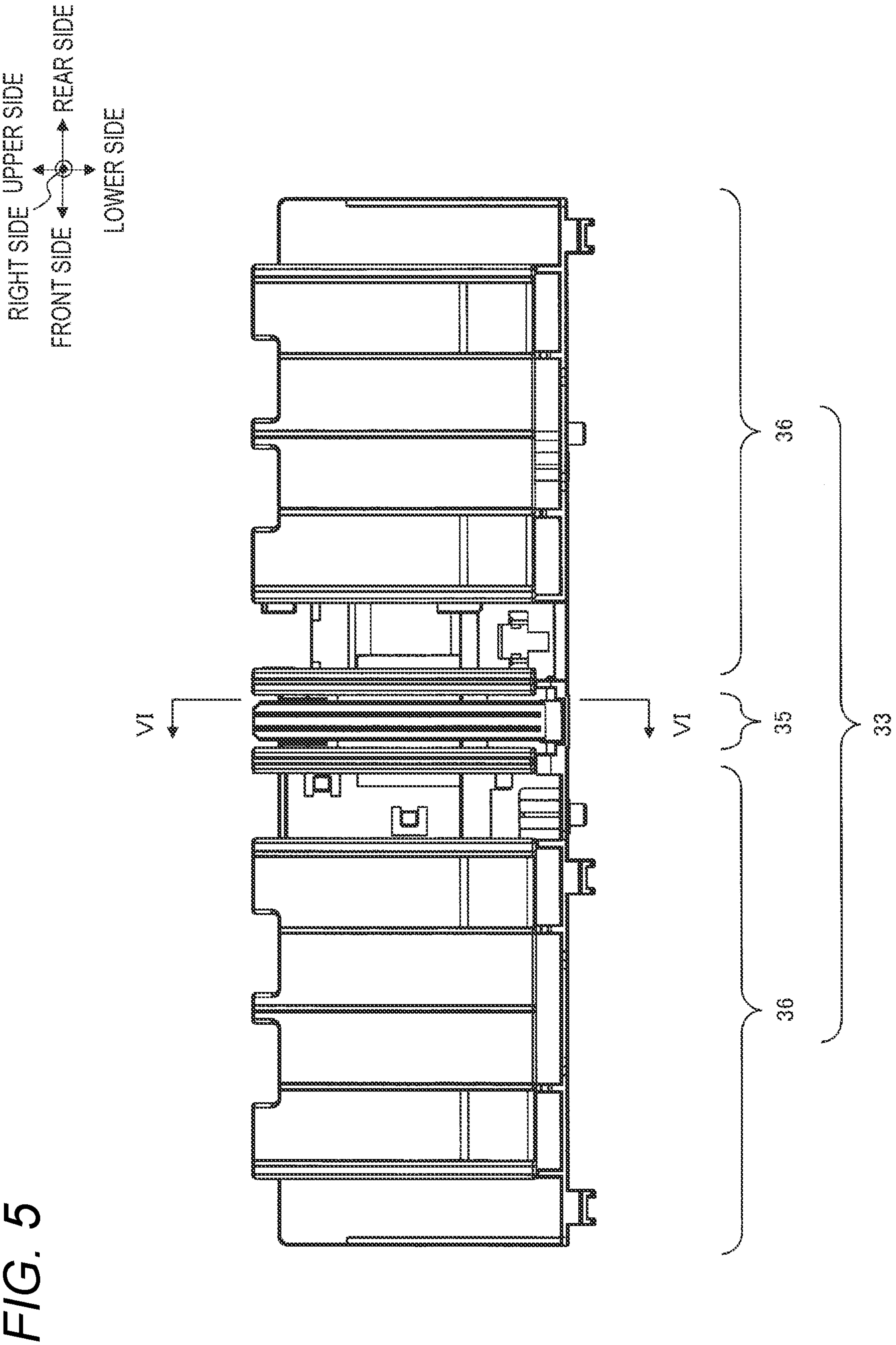
FIG. 5 is a front view of the entire feed guide mechanism as viewed from a direction indicated by an arrow V in FIG. 4.
Figure 6:
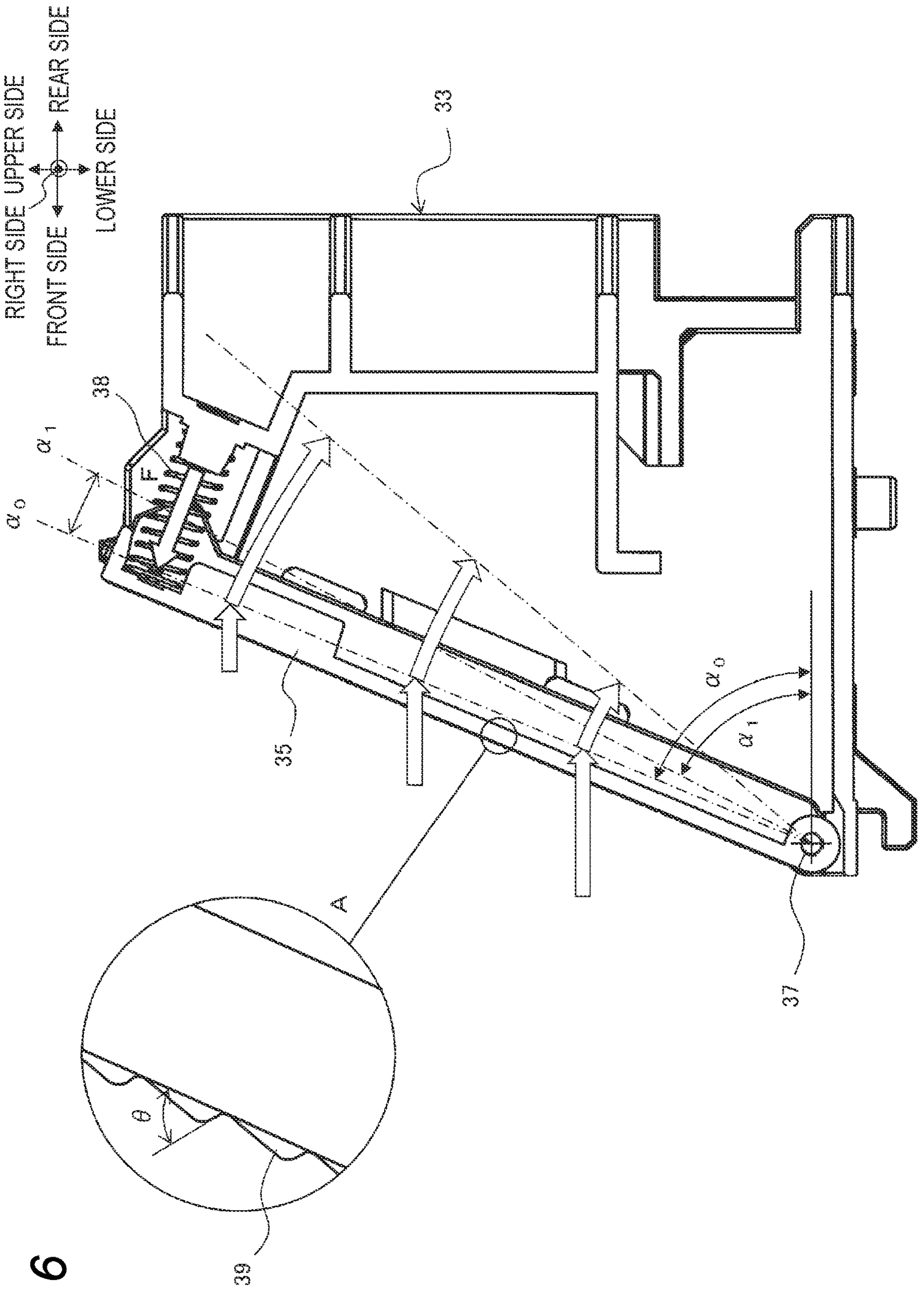
FIG. 6 is a cross-sectional view of the entire feed guide mechanism taken along a line VI-VI in FIG. 5.

FIG. 6 is a cross-sectional view of the feed guide mechanism 33 taken along a line VI-VI in FIG. 5, and illustrates the separation piece 35 and a part of the separation piece 35 in an enlarged manner. In the example of the present embodiment, the lower end portion of the separation piece 35 is pivotally connected to a lower end portion of the facing portion of the housing 2 via a pivot connection mechanism 37 implemented by a hinge whose pivot axis direction is the left-right direction, and an upper end portion of the separation piece 35 is connected to the feed guide mechanism 33 via a restoration member 38 implemented by a compression spring on a rear side of the separation piece 35. Therefore, the posture of the separation piece 35 may be changed between a first angular position $\alpha_0$ closest to an upright posture in a vertical direction and a second angular position $\alpha_1$ closest to a laid down posture in a horizontal direction. Further, the first angular position $\alpha_0$ coincides with an inclination angle of the guide member 36, and when the separation piece 35 is pivoted toward the second angular position $\alpha_1$ inclined rearward than the first angular position $\alpha_0$, the restoration member 38 applies a restoring force F for restoring the separation piece 35 to the first angular position $\alpha_0$. The posture at the first angular position $\alpha_0$ is an example of a first posture, and the posture at the second angular position al is an example of a second posture.

As illustrated in an enlarged view A, on a surface of the front side surface of the separation piece 35 serving as a contact surface with the sheet S, rows of a plurality of uneven portions 39 are formed along the upper-lower direction so as to have a shallow periodic waveform at short intervals. At this time, an inclination angle formed by a lower inclined surface of each of the plurality of uneven portions 39 with respect to a main body surface of the separation piece 35 is an attack angle θ that greatly affects a separation resistance, which will be described later, acting on the sheet S.

Sheet Feeding Function of Feed Guide Mechanism

Figure 7:
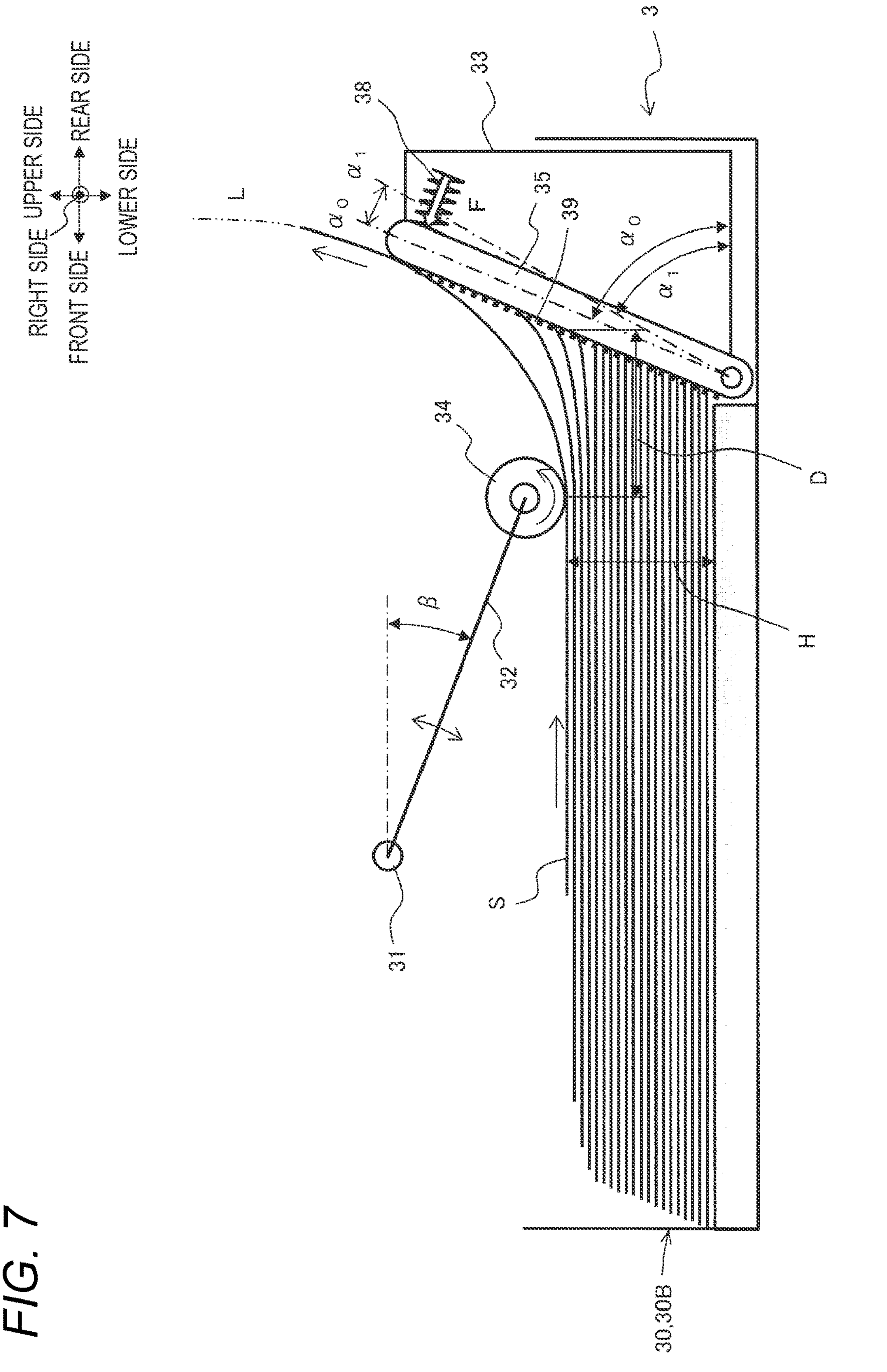
FIG. 7 is a front-rear direction cross-sectional view schematically illustrating a sheet feeding operation state of the supply unit.

Next, a sheet feeding function of the feed guide mechanism 33 in the supply unit 3 will be described. FIG. 7 is a diagram schematically illustrating a sheet feeding operation state of the supply unit 3. In FIG. 7, a plurality of sheets S are accommodated in the accommodating portion 30B of the feed tray 30 so as to be stacked at a height H. The swing arm 32 is swingable around a swing shaft 31 positioned on an upper side of the accommodating portion 30B, and the feed roller 34 provided at the lower end portion of the swing arm 32 is always brought into contact with a rear part of a surface of the uppermost sheet S with a predetermined pressing force by an internal drive mechanism. At this time, the entire swing arm 32 pivots downward at a swing angle β from the horizontal posture, and the swing angle β is inversely proportional to the stacking height H of the sheets S. As the swing arm 32 pivots downward, a separation distance D between a contact point of the feed roller 34 with the sheet S and the separation piece 35 reduces, that is, the separation distance D is proportional to the stacking height H of the sheets S.

In the operation state according to the operation parameters as described above, the feed roller 34 is rotated by the internal drive mechanism, and thus the sheet S is fed toward the feed guide mechanism 33. At this time, the feed roller 34 rotates with an appropriate torque to generate a feeding force while being in contact with the uppermost sheet S with a sufficient pressing force, and thus all the stacked sheets S are moved toward the feed guide mechanism 33 in order from the top. Then, movement of all the sheets S is temporarily stopped upon a leading edge portion of each of the sheets S on the feeding direction side (rear side) is brought into contact with the front side surface of the feed guide mechanism 33 (the guide members 36 and the separation piece 35). However, some sheets S positioned on upper layers are further moved by being roll-deformed upward due to winding of the feed roller 34. Since the uppermost sheet S among the sheets S positioned on the upper layers receives direct friction from the feed roller 34 and is applied with a high feeding force, the uppermost sheet S passes through the feed guide mechanism 33, and is discharged from the supply unit 3 and fed to the conveying unit 4. However, the sheets S on the second and subsequent layers are locked, at respective leading edge portions, to the fine uneven portions 39 on the surface of the separation piece 35, that is, receive the high separation resistance from the separation piece 35, and are restricted from moving.

As described above, the supply unit 3 according to the present embodiment functions such that a feeding function of the sheet S based on the feeding force from the feed roller 34 and a stopping function of the sheet S based on the separation resistance from the separation piece 35 cooperate with each other, and therefore, it is possible to separate only the uppermost sheet among the plurality of sheets S stacked in the accommodating portion 30B and supply the uppermost sheet to the conveying unit 4. However, in order to ensure stable separation and supply of only the uppermost sheet, it is necessary to strictly adjust the balance between the feeding function based on the feed roller 34 and the stopping function based on the separation piece 35. For example, when the separation resistance of the separation piece 35 is too low, a malfunction (hereinafter, referred to as multi-feeding) may occur in which the feed roller 34 simultaneously feeds two or more sheets S. On the other hand, when the separation resistance of the separation piece 35 is too high, and a malfunction (hereinafter, referred to as "idle feeding") may occur in which the feed roller 34 idles and no sheet S may be supplied.

There are a plurality of factors that may affect the occurrence of the malfunctions including the multi-feeding and the idle feeding, and for example, as illustrated in FIG. 8, the sheet thickness of the sheet S is also a factor that affects the occurrence of the malfunctions. That is, the thinner the sheet S is, the more easily the sheet S is roll-deformed upward due to the winding of the feed roller 34, and therefore, even the second and subsequent sheets S may easily pass without being locked to the fine uneven portions 39 on the surface of the separation piece 35, that is, the separation resistance is substantially lowered, and the multi-feeding is likely to occur. On the other hand, the thicker the sheet S is, the more easily the sheet S is locked to the uneven portions 39 of the separation piece 35 with the high rigidity strength instead of being roll-deformed, that is, the separation resistance is substantially increased, and the idle feeding is likely to occur.

When the sheet S is in a fully loaded state in which the consumption of the sheet S does not progress in the accommodating portion 30B, the stacking height H of the sheet S is high, and the arm swing angle β is small, as characteristics of the swing arm 32, biting of the feed roller 34 with respect to the sheet S deteriorates, and the feeding force is reduced. In this case, the separation resistance of the separation piece 35 is relatively increased, and as a result, idle feeding is likely to occur. On the other hand, when the sheets are in the empty state in which the remaining number of sheets S is small in the accommodating portion 30B, the stacking height H of the sheets S is low, and the arm swing angle β is large, as the characteristics of the swing arm 32, the biting of the feed roller 34 with respect to the sheet S is improved due to its own weight, and the feeding force is increased. In this case, the separation resistance of the separation piece 35 is relatively reduced, and as a result, multi-feeding is likely to occur.

When the sheets S are in the fully loaded state, the stacking height H of the sheets S is high, and the separation distance D between the contact point of the feed roller 34 and the separation piece 35 is large, the sheet S is likely to be roll-deformed upward due to the winding of the feed roller 34. In this case, the separation resistance is substantially lowered, and the multi-feeding is likely to occur. On the other hand, when the sheet S is in the empty state, the stacking height H of the sheet S is low, and the separation distance D between the contact point of the feed roller 34 and the separation piece 35 is small, the upward roll deformation of the sheet S is small. In this case, the separation resistance is substantially increased, and the idle feeding is likely to occur.

As described above, each operation parameter greatly varies according to the sheet feeding operation state at that time, and the feeding force of the feed roller 34 and the separation resistance of the separation piece 35 also substantially greatly vary under the influence of the operation parameters. The reason for this is that the multi-feeding is likely to occur in a state in which it is easy to feed the sheet S, and the idle feeding is likely to occur in a state in which it is difficult to feed the sheet S.

Meanwhile, the separation resistance acting in the feed guide mechanism 33 is uniquely set by two mechanical design parameters, that is, the inclination angle $\alpha_0$ of the separation piece 35 itself and the attack angle θ of each of the plurality of uneven portions 39 on the surface of the separation piece 35. However, as described above, a substantial working value of the separation resistance greatly vary under the influence of other operation parameters corresponding to the sheet feeding operation state at that time.

On the other hand, in the present embodiment, as described above, the posture of the separation piece 35 of the feed guide mechanism 33 may be changed between the first angular position $\alpha_0$, which is the same as that of the guide member 36, and the second angular position $\alpha_1$, which is inclined rearward than the first angular position $\alpha_0$, around the pivot connection mechanism 37 at the lower end portion of the separation piece 35. Further, the upper end portion of the separation piece 35 is always biased by a restoring force F for restoring the separation piece 35 to the first angular position $\alpha_0$ by the restoration member 38.

Accordingly, for example, when the sheet S to be used is thin and low in rigidity strength, an inclination angle position of the separation piece 35 receiving the sheet S is likely to be maintained at the first angular position $\alpha_0$. That is, the uneven portion 39 on the surface maintains the original attack angle θ and easily locks the leading edge portion of the sheet S in the sheet feeding direction, and as a result, the separation resistance may be maintained at a high level. Similarly, the separation piece 35 may maintain the separation resistance at a high level in a sheet feeding operation state in which it is easy to feed the sheet S due to the variation of each operation parameter.

On the other hand, for example, when the sheet S to be used is thick and high in rigidity strength, the inclination angle position of the separation piece 35 receiving the sheet S is likely be inclined rearward toward the second angular position $\alpha_1$. That is, the attack angle θ of the uneven portion 39 on the surface is relatively reduced by an amount of the inclination, and the leading edge portion of the sheet S in the sheet feeding direction is less likely to be locked, and as a result, the separation resistance is reduced. Similarly, the separation piece 35 may reduce the separation resistance according to the difficulty of sheet feeding in a sheet feeding operation state in which it is difficult to feed the sheet S due to the variation of each operation parameter.

As described above, in the present embodiment, in a state in which it is easy to feed the sheet S, the rearward inclination pivot angle of the separation piece 35 is reduced, and the separation resistance is increased, so that the occurrence of multi-feeding may be prevented. On the other hand, in a state in which it is difficult to feed the sheet S, the rearward inclination pivot angle of the separation piece 35 is increased, and the separation resistance is reduced, so that the occurrence of idle feeding may be prevented. In other words, the separation piece 35 may automatically adjust the separation resistance to reduce the occurrence of multi-feeding and idle feeding in response to the change in operation parameter.

As described above, in the present embodiment, an image is recorded by the image recording unit 5 on the sheet S on the conveying path L formed in the housing 2. The accommodating portion 30B is provided in the feed tray 30 that may be inserted into and removed from the housing 2, and the sheets S accommodated in the accommodating portion 30B are guided to the conveying path L by the guide members 36 that are fixed.

In the housing 2, the separation piece 35 is pivotally provided separately from the guide members 36, and separates the sheets S guided by the guide members 36 one by one. For example, when the thick sheet S is brought into contact with the separation piece 35, due to the large rigidity of the sheet S, the separation piece 35 is pivoted to a slightly horizontal posture, the separation resistance may be reduced, and the idle feeding may be prevented. For example, when the thin sheet S is brought into contact with the separation piece 35, due to low rigidity of the sheet S, the separation piece 35 is not pivoted, but takes a slightly vertical posture, the separation resistance may be increased, and the multi-feeding may be prevented.

According to the present embodiment, since the posture of the pivotable separation piece 35 varies depending on whether the sheet S is thick or thin, both the prevention of multi-feeding of thin sheets S and the prevention of idle feeding of thick sheets S may be achieved.

Further, in the present embodiment, in particular, the separation piece 35 is configured to change the posture between the first angular position $\alpha_0$ closest to the vertical direction and the second angular position $\alpha_1$ closest to the horizontal direction by pivoting as described above.

For example, when the thick sheet S comes into contact with the separation piece 35, the separation piece 35 is in the second angular position $\alpha_1$ closet to the horizontal direction due to large rigidity of the sheet S, the separation resistance is reduced, and the idle feeding may be prevented. For example, when the thin sheet S comes into contact with the separation piece 35, the separation piece 35 is in the first angular position $\alpha_0$ closest to the vertical direction due to small rigidity of the sheet S, the separation resistance is increased, and the multi-feeding is prevented.

Further, in the present embodiment, in particular, there is further provided the restoration member 38 for applying the restoring force F for restoring the separation piece 35 to the first angular position $\alpha_0$ when the separation piece 35 is changed from the first angular position $\alpha_0$ to the second angular position α1. The separation piece 35 provides a small separation resistance while remaining at the second angular position $\alpha_1$ when, for example, a thick sheet S with high rigidity is brought into contact therewith, meanwhile, the separation piece 35 moves to the first angular position $\alpha_0$ due to the action of the restoring force F of the restoration member 38 when a thin sheet S with low rigidity is brought into contact therewith, and a large separation resistance may be provided.

Further, in the present embodiment, in particular, the separation piece 35 pivots around the lower end portion thereof via the pivot connection mechanism 37. For example, when a thick sheet S with high rigidity is brought into contact with the separation piece 35, the separation piece 35 takes a posture in which an upper end portion side is slightly inclined toward the deep side (rear side) in the insertion direction of the feed tray 30 around the lower end portion, and thus a small separation resistance may be provided. For example, when a thin sheet S with low rigidity is brought into contact with the separation piece 35, the separation piece 35 takes a posture in which the upper end portion side is slightly raised from the inclined posture, and thus a large separation resistance may be provided.

By using a method of pivoting the separation piece 35 in order to make the separation resistance variable as described above, the magnitude of the separation resistance may be easily adjusted simply by the rotation angle as compared with, for example, a method of sliding the separation piece 35.

In the present embodiment, in particular, the feed roller 34 and the swing arm 32 are provided. The feed roller 34 picks up the sheet S from the accommodating portion 30B of the feed tray 30 and feeds the sheet S to the conveying path L. The feed roller 34 is rotatably supported at an end portion of the swing arm 32 on the deep side (rear side) in the insertion direction of the feed tray 30. The swing arm 32 swings around the swing shaft 31 at an end portion on the near side (front side) in the insertion direction of the feed tray 30.

In the case of the so-called empty state in which the number of sheets S accommodated in the accommodating portion 30B is small, the swing arm 32 swings such that the deep side is lowered, and the feed roller 34 is in contact with the uppermost sheet among the small number of sheets S. In the case of the so-called fully loaded state in which the number of sheets S accommodated in the accommodating portion 30B is large, the swing arm 32 swings such that the deep side is raised, and the feed roller 34 is in contact with the uppermost sheet among the large number of sheets S.

According to the present embodiment, the feed roller 34 is displaced up and down according to the number of sheets S in the accommodating portion 30B, so that the uppermost sheet S may be reliably fed to the conveying path L while being in contact with the uppermost sheet S.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The present disclosure is not limited to the above embodiment, and various modifications may be made without departing from the spirit and technical scope of the present disclosure. Hereinafter, such modifications will be described in order.

(1) A Case where the Separation Piece is Provided with Uneven Portions Having Different Attack Angles In the image recording apparatus 1 of the above-described embodiment, in order to apply the separation resistance, the plurality of uneven portions 39 are provided on the contact surface side of the separation piece 35 with which the sheet S is brought into contact. Further, in the above-described embodiment, when the separation piece 35 is pivotally inclined with respect to the facing portion around the lower end portion, the feed roller 34 is rotatably supported with respect to the swing arm 32 on the near side in the insertion direction.

Figure 9:
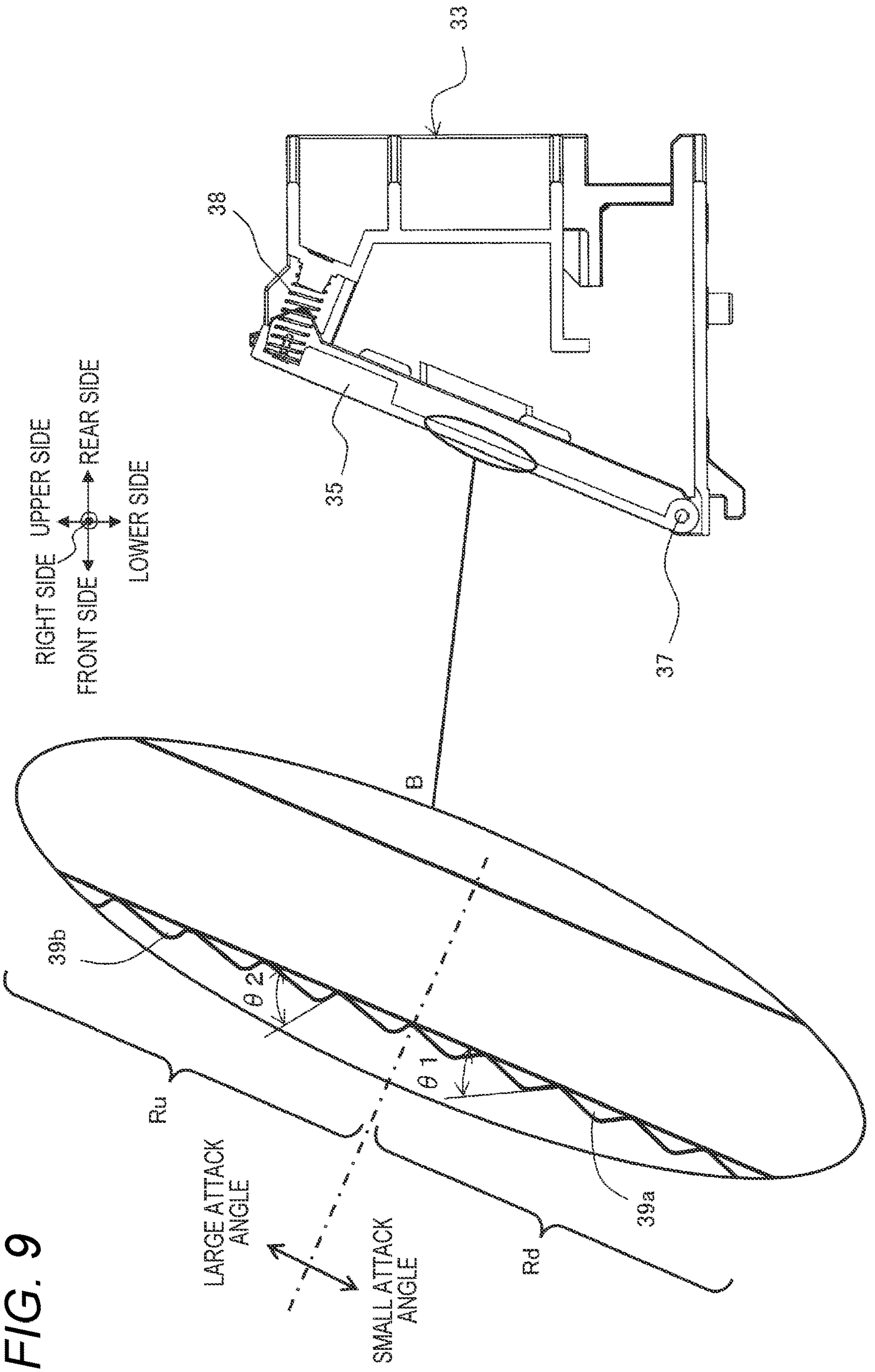
FIG. 9 is a cross-sectional view of the separation piece in a case where the separation piece includes uneven portions having different attack angles.

For example, in the above-described empty state, the position of the feed roller 34 swung by the swing arm 32 is lowered to the vicinity of a lowermost portion of the accommodating portion 30B, and approaches a pivot center of the pivoting separation piece 35. Since the separation distance D between the feed roller 34 and the separation piece 35 is short, the separation resistance of the separation piece 35 acting on the sheet S fed by the feed roller 34 is slightly increased. In the present modification, as shown in FIG. 9, the attack angle θ of a first uneven portion 39*a* in a first region Rd located at a lower side is set to a relatively small first angle θ1, and thus the action of large separation resistance as described above may be mitigated.

For example, in the fully loaded state described above, the position of the feed roller 34 swung by the swing arm 32 is raised to the vicinity of an uppermost portion of the accommodating portion 30B, and moves away from the separation piece 35 which pivots around the lower end portion thereof. Since the separation distance D between the feed roller 34 and the separation piece 35 is increased, the separation resistance of the separation piece 35 to the sheet S fed by the feed roller 34 is slightly reduced. In the present modification, since the attack angle θ of a second uneven portion 39*b* in a second region Ru located at an upper side is set to a relatively large second angle θ2, the small separation resistance as described above may be reinforced and increased.

According to the present modification, both of the prevention of multi-feeding and the prevention of idle feeding may be achieved, an influence of a vertical position fluctuation of the feed roller 34 may be suppressed regardless of whether the sheet S is thin or thick, and more uniform separation resistance may be applied to the sheets S with different sheet thicknesses.

From the viewpoint of fluctuation of the feeding force of the feed roller 34 to the sheet S caused by the magnitude of the swing angle R of the swing arm 32, for example, in the case of the empty state described above, the position of the feed roller 34 swung by the swing arm 32 is lowered to the vicinity of the lowermost portion of the accommodating portion 30B. This state is a so-called good biting state in which a slip of the sheet S is less likely to occur due to the weight of the feed roller 34 and the swing arm 32 or the like, and a large feeding force is obtained, and the separation resistance of the separation piece 35 does not act so much, and idle feeding may be less likely to occur. This case leads to a contrary side in degree of difficulty of occurrence of the idle feeding caused by the short separation distance D between the feed roller 34 and the separation piece 35, it is preferable to appropriately set the magnitude of the feeding force and adjust the magnitude of the separation resistance.

Similarly, in the fully loaded state described above, the position of the feed roller 34 swung by the swing arm 32 is raised to the vicinity of the uppermost portion of the accommodating portion 30B. In this state, since the weights of the feed roller 34 and the swing arm 32 do not sufficiently act on the sheet media, a large feeding force is not necessarily obtained due to occurrence of slip or the like, and idle feeding is likely to occur due to separation resistance of the separation piece 35. This case also leads to a contrary side in degree of difficulty of occurrence of the idle feeding caused by the large separation distance D between the feed roller 34 and the separation piece 35, it is preferable to appropriately set the magnitude of the feeding force and adjust the magnitude of the separation resistance.

In addition to those described above, the methods according to the above-described embodiment and the modifications may be used in combination as appropriate.

In addition, although not individually exemplified, the present disclosure is implemented in various modified forms without departing from the gist thereof

What is claimed is:

1. An image recording apparatus, comprising:

a housing in which a conveying path is formed;

a feed tray insertable into and removable from the housing and including an accommodating portion configured to accommodate sheet media in a stacked state;

an image recording unit configured to record an image on one of the sheet media in the conveying path;

a guide member provided at a facing portion of the housing which faces an end portion of the feed tray inserted into the housing, and configured to guide one of the sheet media in the accommodating portion to the conveying path; and a separator pivotally provided at the facing portion of the housing and configured to contact the sheet media accommodated in the accommodating portion and to separate the sheet media guided by the guide member one by one, wherein the separator is configured to move between a first posture and a second posture which is closer to a horizontal posture than the first posture; and a spring configured to apply a given force to an upper end of the separator to bias the separator in the first posture.

2. The image recording apparatus according to claim 1, further comprising:

a pivot connection mechanism that pivotally connects a lower end portion of the separator to a lower end portion of the facing portion of the housing.

3. The image recording apparatus according to claim 2, further comprising:

a feed roller configured to feed one of the sheet media from the accommodating portion of the feed tray to the conveying path; and a swing arm that rotatably supports the feed roller at a back side of the housing in an insertion direction of the feed tray and includes a swing shaft at a front side of the housing in the insertion direction of the feed tray.

4. The image recording apparatus according to claim 1, wherein the facing portion of the housing is disposed at a back side of the housing in an insertion direction of the feed tray.

5. An image recording apparatus, comprising:

a housing in which a conveying path is formed;

a feed tray insertable into and removable from the housing and including an accommodating portion configured to accommodate sheet media in a stacked state;

an image recoding unit configured to record an image on one of the sheet media in the conveying path;

a guide member provided at a facing portion of the housing which faces an end portion of the feed tray inserted into the housing, and configured to guide one of the sheet media in the accommodating portion to the conveying path; and a separator pivotally provided at the facing portion of the housing and configured to contact the sheet media accommodated in the accommodating portion and to separate the sheet media guided by the guide member one by one, wherein;

the separator is provided with a first uneven portion and a second uneven portion, the first uneven portion is provided in a first region on a contact surface of the separator with the sheet media and has a first attack angle with respect to an assumed contact direction with the sheet media, and the second uneven portion is provided in a second region on the contact surface of the separator above the first region and has a second attack angle larger than the first attack angle.

6. The image recording apparatus according to claim 5, wherein the separator is configured to move between a first posture and a second posture which is closer to a horizontal posture than the first posture.

7. The image recording apparatus according to claim 6, wherein the spring is configured to apply the given force to restore the separator to the first posture when the separator is moved from the first posture to the second posture.

8. The image recording apparatus according to claim 5, wherein the first attack angle is an inclination angle formed by a lower inclined surface of the first uneven portion with respect to a main body surface of the separator.

* * * * *